Sept. 9, 1969  R. WICK ET AL  3,465,656
FLASH INTENSITY REGULATING CIRCUIT FOR FLASH CAMERAS
Filed Oct. 28, 1966  2 Sheets-Sheet 1

INVENTORS
RICHARD WICK
FRIEDRICH BIEDERMANN
ALFRED WINKLER
FRITZ BESTENREINER
GERD KIPER
GÜNTHER PAWLIK
REINHARD VON SYBEL
ERWIN VON WASILIEWSKI
KARL WAGNER

BY Michael S. Striker
Attorney

United States Patent Office

3,465,656
Patented Sept. 9, 1969

3,465,656
FLASH INTENSITY REGULATING CIRCUIT FOR FLASH CAMERAS
Richard Wick, Gruenwald, near Munich, Friedrich Biedermann, Unterhaching-Munich, Alfred Winkler, Munich, Friedrich Bestenreiner, Gruenwald, near Munich, Gerd Kiper, Unterhaching-Munich, Gunter Pawlik, Munich, Reinhard von Sybel, Kralling, Erwin von Wasiliewski, Munich, and Karl Wagner, Ottobrunn, Germany, assignors to Agfa-Gevaert Aktiengesellschaft, Leverkusen, Germany
Continuation-in-part of application Ser. No. 562,664, July 5, 1966. This application Oct. 28, 1966, Ser. No. 590,407
Claims priority, application Germany, Oct. 28, 1965, A 50,634
Int. Cl. G01j *1/52, 1/36*
U.S. Cl. 95—10                     12 Claims

ABSTRACT OF THE DISCLOSURE

A flash camera arrangement in which the intensity of brightness of the flash is regulated as a function of the ambient light intensity. An electronic triggering circuit initiates a preliminary flash a portion of which is reflected from the object or scene to be photographed. A photoelectric element in the electronic circuit generates a signal as a function of the reflected light from the preliminary flash and the ambient light conditions. When the shutter of the camera becomes released, the main flash of the camera is regulated in intensity as a function of the ambient light intensity and the light reflected as a result of a preliminary flash.

---

Figure 1:
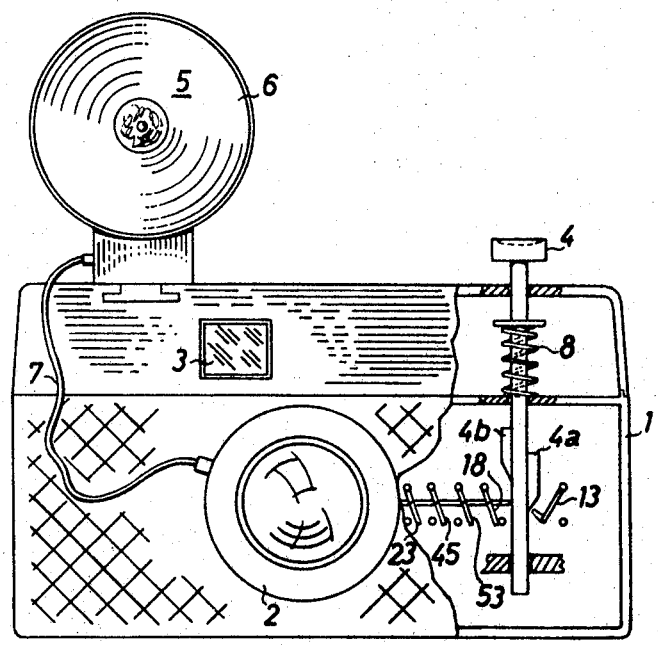

The present application is a continuation-in-part of our copending application Ser. No. 562,664.

The present invention relates to photographic cameras adapted to flash exposures and operating in conjunction with electronic apparatus whereby the intensity of the flash is regulated.

When applying electronic flash apparatus, considerable difficulty is experienced in inserting, into the shutter, the proper light data, with respect to the diaphragm, and dependent upon the distance of the object to be photographed. The duration of the flash is so short that automatic flash provisions may be readily introduced from a practical viewpoint.

Acordingly, it is an object of the present invention to provide a photographic camera adapted to flash exposures, wherein the intensity of the flash is regulated as a function of the prevailing light conditions and the distance of the object (being photographed) from the flash source.

Another object of the present invention is to provide a photographic camera adapted to flash exposures, and operating in conjunction with an electronic apparatus which causes the generation of a preliminary flash whereby the main photographic flash is regulated as a function of distance of the object from the flash source.

A further object of the present invention is to provide a photographic camera adapted to flash exposures and operating in conjunction with an electronic apparatus, as described, wherein the latter includes a light sensitive element which serves as the regulating member by combining the light, prevailing in the surroundings, with the light reflected from the preliminary flash.

A still further object of the present invention is to provide a photographic camera adapted to flash exposures and operating in conjunction with an electronic apparatus, as set forth, which is simply constructed, reliable in operation, and economical to manufacture.

With the preceding objects in view, the present invention includes a timing circuit actuated by a cam situated on the release rod. The timing circuit charges a capacitor to a predetermined potential over a period of time dependent upon the combined effects of the prevailing light conditions as well as the intensity of the reflected light from a preliminary flash generated for the purpose of obtaining the distance of the object being photographed. When the capacitor has attained its predetermined charge, a Schmidt trigger circuit is actuated which, in turn, causes the main photographic flash to occur. A preliminary flash is initiated by the motion of the release rod and takes place during the charging of the capacitor within the timing circuit. A light-sensitive element is used to provide a current proportional to the combined effects of the light prevailing in the surroundings, as well as the light reflected from the preliminary flash. A direct current power supply provides the energy for the flash as well as for operating the electronic circuity.

Figure 2:
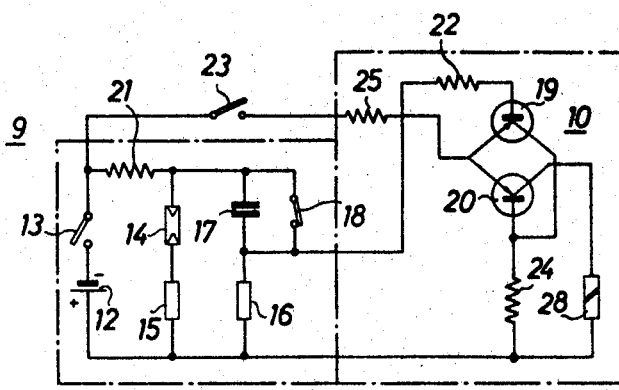
Figure 2:
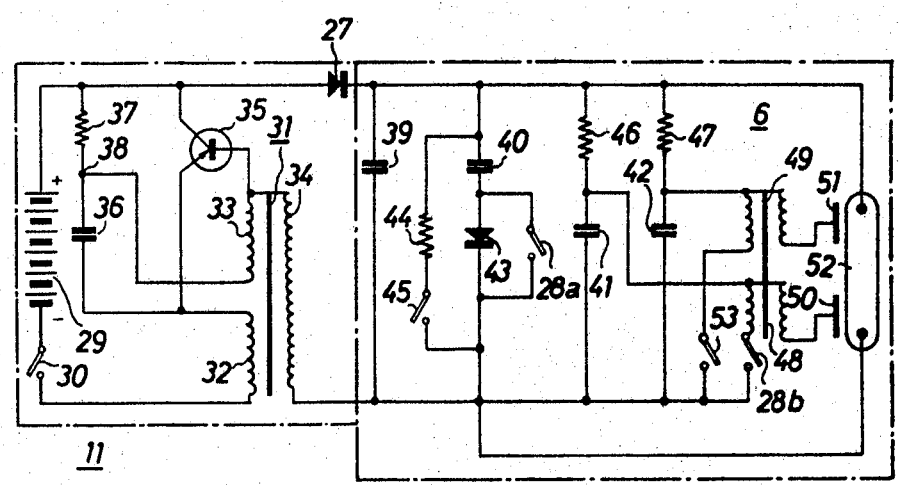

The novel features which are considered as characteristic of the invention, are set forth in particular in the appended claims. The invention itself, however, both as to its additional objects and advantages thereof, will be best understood from the following description of specific embodiments and read in connection with the acompanying drawings in which:

FIG. 1 is an elevational view of a photographic camera adapted to flash exposures, with parts broken away, and shows the mechanical arrangement whereby electrical switching contacts are actuated by the motion of the release rod; and FIG. 2 is an electrical schematic diagram showing the construction of the electronic circuity whereby the intensity of the photographic flash is regulated as a function of the light conditions, prevailing in the surroundings and the distance of the object from the flash source.

Referring to the drawing, and in particular to FIG. 1, the basic photographic camera 1 includes an objective lens 2, a viewer 3, and a release rod 4. The camera 1 is equipped with a reflector 5 of an electronic flash apparatus 6 which is connected, by way of a cable 7, to a switch actuated by the release rod 4. This arrangement is similar to that commonly known in the art.

The release rod 4 is slidably guided by the housing of the camera 1, and is normally maintained in an upward position through the action of spring 8. The release rod is provided with two cams, 4a and 4b, which actuate, in proper sequence, two groups of switching contacts. The functional relationship of the switching contacts is shown in FIG. 2, which may be analyzed in essentially four different sections. These four sections comprise a light controlled timing circuit 9, a switching circuit 10 designated in the form of a Schmidt-trigger, a high voltage direct current power supply 11, and the flash apparatus 6.

The timing circuit 9 includes a direct current power supply 12 connected in series with a switch 13 which is actuated by the cam 4a of the release rod 4. The switch 13 becomes closed during the initial phase of the release rod motion. Connected to the switch 13, is a resistor 21 to which is connected, in turn, a photoelectric cell 14 in series with a compensating resistor 15. A charging capacitor 17 and charging resistor 16 are connected substantially in parallel with the components 14 and 15. The photoelectric cell 14 is mounted to the camera so that it is exposed to the prevailing light conditions. The charging condenser 17 is bridged by a switch 18 actuated by the cam 4b of the release rod. This actuation of the switch 18, opens the latter after a predetermined amount of motion of the release rod.

The switching circuit 10 includes two transistors 19 and 20 whose emitters are connected together and lead to the negative terminal of the power supply 12, by way of the resistor 25 and switch 23 which is closed by the cam 4b. The base of transistor 19 is connected, via the resistor 22 to the junction of the charging capacitor 17 and resistor 16. The collector of transistor 19 is connected to the base of transistor 20, which leads to the positive terminal of the power supply 12, by way of the resistor 24. A relay coil 28 is connected in series with the emitter-collector path of transistor 20. The relay coil 28 actuates the switching contacts 28a and 28b associated with the flash apparatus 6.

The energy of the direct current power supply 11 is provided, in the commonly-known manner, by a battery 29 of relatively lower voltage. The negative terminal of the battery 29 leads, by a way of a switch 30, to the primary winding 32 of a transformer 31. The latter includes a control winding 33 adjacent to the primary winding 32. The control winding 33 is connected to a transistor chopper 35 whose emitter is connected directly to the primary winding 32. The collector of the transistor chopper 35 is connected to the positive terminal of the battery 29. Aside from this, the emitter of the transistor 35 is connected to a capacitor 36 which is, in turn, connected to a resistor 37 leading to the positive terminal of the battery 29. The circuit through the control winding 33 is completed by being connected to the junction 38 between the capacitor 36 and resistor 37.

Connected to the secondary winding 34 of the transformer 31 and to the diode 27, is the flash circuit 6. The circuit includes four capacitors, the two flash capacitors 39 and 40, and the two ignition capacitors 41 and 42. A diode 43 is connected to the capacitor 40 which delivers the energy for the main flash. The diode is directed so as to allow charging of the capacitor, but to prevent discharging thereof. The diode 43 is bridged by the switching contact 28a of the relay 28. A resistor 44 is connectable across the capacitor 40 and diode 43, by way of the switch 45. The latter is actuated by the cam 4b on the release rod, and, when closed, the resistor 44 is connected across the power supply 11.

Resistors 46 and 47 are connected, respectively, to capacitors 41 and 42. The junctions between capacitor 41 and resistor 46, as well as between capacitor 42 and resistor 47, are connected, respectively, to the primary windings of an ignition coil 48–49. The secondary windings of the ignition coil are connected to ignition electrodes 50 and 51 associated with a flashbulb 52. The primary windings of the ignition coils 48 and 49 are connectable to the power supply by way of switches. The switch 53 is actuated by the cam 4b on the release rod, to discharge the capactior 42 associated with the preliminary flash. The switching contact 28b is operated by the relay 28 and serves to discharge the capacitor 41 associated with the ignition of the main flash.

The arrangement, in accordance with the present invention, operates in the following manner:

In the normal or initial state of the circuit, all switches and switching contacts, with the exception of switch 18, are in the open position as shown in the drawing. In order to take a flash exposure, the switch 30 is closed. This manual operation must occur separately since the charging of capacitors 39 and 42 takes place over a predetermined time interval, when the power supply 11 is designed for portable applications.

If, as a result of acoustical or optical indications, it is established that the capacitors are charged to their maximum values, the release rod 4 may be actuated. The switch 13 is, therefore, then closed. The closure of the switch 13 causes the circuit 9 to be in the operative state.

Through further actuation of the release rod 4, the switch 18 is opened and the switches 23, 45 and 53 are, simultaneously, closed. With the opening of switch 18, the timing circuit 9 is initiated due to the charging of the capacitor 17 through the resistor 16. The closing of switch 45 causes the charging of the capacitor to be diminished due to the effect of resistor 44. A closing of switch 53, finally, causes the release of the preliminary flash, since the charging of the capacitor 42 results in a current surge within the ignition coil 49. This current surge is reflected in the ignition of the flash bulb 52. The energy for the flash is stored by the capacitor 39. With the presence of the diode 43, simultaneous discharge of the capacitor 40 is inhibited.

In conjunction with the four preceding switching operations, the release rod 4 may cause the opening of the shutter in the commonly-known manner. Since these mechanical operations have considerably more inertia than the ignition of the preliminary flash, none of the reflected light of the preliminary flash impinges upon the covered shutter. This reflected light does, however, impinge upon the photoelectric cell 14. The reflected light is combined with the light prevailing in the surrounding environment, and acts upon the photoelectric cell 14 so as to generate a current which retards the charging of the capacitor 17.

Upon actuation of the switching arrangement associated with the cam 4b, so that switches 13 and 23 are closed and switch 18 is open, the transistor 19 becomes conducting because its base is relatively negative with respect to its emitter. As a result, the base emitter of transistor 20 are substantially of equal potential, and, accordingly, relay 28 does not become actuated.

If, now, the potential of capacitor 17 acquires a predetermined value, the emitter-collector path of the transistor 19 becomes non-conducting. As a result, the relay 28 is firmly actuated. With the closing, thereby, of the two switching contacts 28a and 28b, the diode 43 is shunted and the main flash is initiated. At this point the charge of the capacitor, due to its discharging through the resistor 44, has a value which corresponds to the surrounding light conditions as well as the preliminary flash reflected upon the photoelectric cell 14. The intensity of the main flash also corresponds to the brightness and distance of the object being photographed.

The shutter returns to its closed position after a predetermined time interval which may be maintained relatively small, due to the condition that the control operation occurs in a rapid manner. Upon the resetting of the release rod 4, due to the action of spring 8, all switches are returned to their initial or normal positions. As a result of the opening of switch 23, the switching circuit 10 is returned to its original or normal state. The switch 30 may remain closed if further flash exposures are to be taken. If this is not the case, however, this switch can also be opened.

The present invention is also applicable to photographic cameras that operate in conjunction with electronically controlled electromagnets acting upon the shutter. Thus, when the relay 28 releases the main flash, it may also be applied to release the closing motion of the shutter.

While the invention has been illustrated and described as embodied in electronic circuity for flash cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of the prior art, fairly constitute essential characteristics of the generic or specific aspects of this invention.

What is claimed as new and desired to be secured by Letters Patent is:

1. In a photographic camera, in combination, shutter means adapted to be opened for carrying out an exposure; main flash means for generating a main flash of light while said shutter means is opened for carrying out an exposure; preliminary flash means for generating a preliminary flash of light before said shutter means is opened for carrying out an exposure; combined shutter and flash actuating means for first actuating said preliminary flash means and then simultaneously actuating said main flash means and said shutter means for opening the latter while said main flash means is actuated; and photoelectric means for adjusting the intensity of the flash of light generated by said means for first actuating said preliminary flash means and and the light of said preliminary flash means reflected by an object to be photographed.

2. The photographic camera as defined in claim 1, including regulating means for regulating the intensity of the main flash as a function of the intensity of the ambient light and the light reflected by said object from said preliminary flash.

3. The photographic camera as defined in claim 2, wherein said regulating means comprises a light-controlled timing circuit.

4. The photographic camera as defined in claim 3 wherein said timing circuit is a capacitor charging circuit, the charging current for said capacitor being delayed by said photoelectric means.

5. The photographic camera as defined in claim 1, including a flash capacitor for storing electrical charge to ignite said main flash.

6. The photographic camera as defined in claim 5 including a resistor for controlling the discharge time of said flash capacitor.

7. The photographic camera as defined in claim 4, wherein said timing circuit comprises a voltage supply; a series combination of a dropping resistor, a photoelectric means, and compensating resistor, said series combination being connected in parallel with said voltage supply; and a series combination of a charging capacitor and charging resistor, connected in parallel with the series combination of said photoelectric cell and compensating resistor.

8. The photographic camera as defined in claim 7 including a first switching means connected in series with said voltage supply and actuated by said shutter means.

9. The photographic camera as defined in claim 7 including a second switching means actuated by said shutter means and connected in parallel with said charging capacitor.

10. The photographic camera as defined in claim 3 including a switching circuit in form of a Schmidt trigger and a relay operated thereby.

11. The photographic camera as defined in claim 6 including ignition capacitors operating in conjunction with said flash capacitor.

12. The photographic camera as defined in claim 11 including a high voltage direct current power supply for executing the main flash.

References Cited

UNITED STATES PATENTS 3,173,347   3/1965   Stimson et al. ____ 95—11.5 XR
3,308,733   3/1967   Von Albedyll et al. ____ 95—10

NORTON ANSHER, Primary Examiner

J. F. PETERS, Jr., Assistant Examiner

U.S. Cl. X.R.

95—11.5; 250—205